(No Model.)

C. H. ELSKAMP.
FLY TRAP.

No. 582,905. Patented May 18, 1897.

WITNESSES
Wm. Bauman Jr.
J. G. Tabler

INVENTOR
Cornelius H. Elskamp
by John Wedderburn
Attorney

UNITED STATES PATENT OFFICE.

CORNELIUS H. ELSKAMP, OF TELLURIDE, COLORADO.

FLY-TRAP.

SPECIFICATION forming part of Letters Patent No. 582,905, dated May 18, 1897.

Application filed November 14, 1896. Serial No. 612,087. (No model.)

*To all whom it may concern:*

Be it known that I, CORNELIUS H. ELSKAMP, a citizen of the United States, residing at Telluride, in the county of San Miguel and State of Colorado, have invented certain new and useful Improvements in Fly-Traps; and I do hereby declare the following to be a full, clear, and exact description of the invention, such as will enable others skilled in the art to which it appertains to make and use the same.

This invention has reference to a novel construction in a fly-trap; and it consists of the features of construction hereinafter fully described and claimed.

Figure 1:
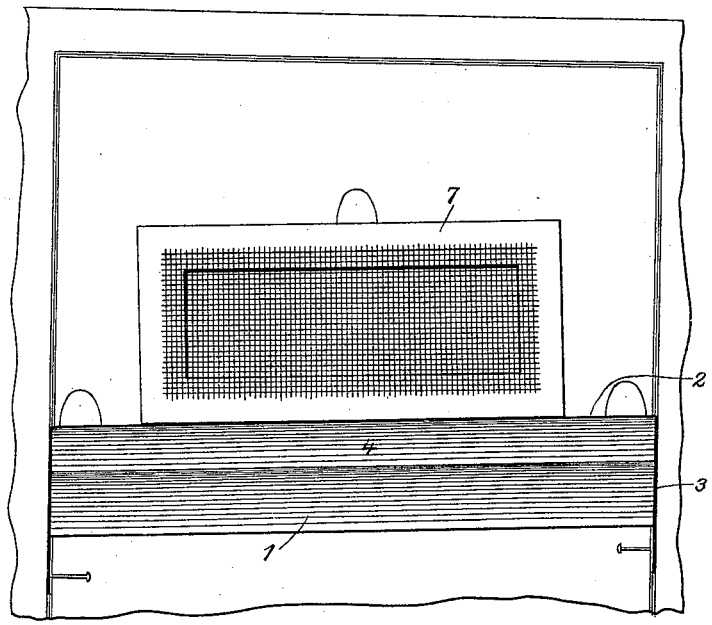
Figure 2:
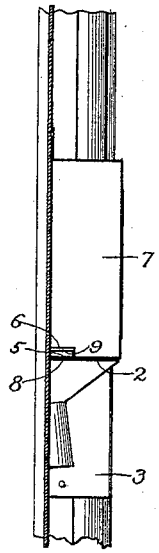

In the accompanying drawings, forming a part of this specification, Figure 1 is a face view of a window provided with this fly-trap. Fig. 2 is a vertical transverse section of the same.

This fly-trap is constructed upon the principle that flies upon the window or window-screen usually crawl toward the upper end thereof, and this trap is situated near the upper end of the window or screen to entrap them when they reach the same.

Referring now to said drawings, 1 indicates an inclined piece extending between the sides of a window-sash and leading to a horizontally-arranged plate 2, whose inner edge sets close to a pane of glass or a screen. This portion of the trap is intended to lead the flies to the cage, which is supported upon this entrapping device. The entrapping device is conveniently made of gauze or wire-netting, and consists of a horizontally-arranged plate 2, provided with downwardly-extending side pieces 3, and the downwardly-extending portions 4 and 1, extending from the outer edge of the horizontal plate 2, said section 4 being inclined toward the window-pane, while the section 1 extends outwardly. The said plate 2 is provided with openings 5, situated next to the window-pane and conveniently-extending projections 6 on either side thereof.

The cage 7 is adapted to rest upon the horizontal plate 2, and its bottom piece is provided with openings 8, situated opposite the openings 5 of the horizontal plate and also provided with projections 9. It is intended that these cages 7 shall be made of cardboard, the sides of which are cut out and covered with some cheap gauze or wire-netting, so that the cage can be destroyed after being filled with flies—for instance, by burning or any other means—thus obviating the necessity of washing out the cage, as is necessary with ordinary cages. This cage can be held in position by a gummed paster being pasted thereto and to the window-pane.

It will be seen from the foregoing description that I provide a cheap and simple fly-trap that will effectually catch them, and which can be made in such an inexpensive manner that they can be given away as advertising mediums, and so that the advertisement and name of the giver can be printed thereon. The material of which the trap is made, however, does not form a part of this invention and can be in large sizes, in which it is obvious that cardboard could not be used.

Having thus described my invention, what I claim as new, and desire to secure by Letters Patent, is—

1. The combination with a window, window-screen or the like, of a horizontally-arranged plate extending across the same, a downwardly and inwardly extending section 4 connected with the outer edge of said plate 2, a downwardly-extending section 1 extending from the lower edge of said section 4, and openings in the said plate 2 communicating with a cage.

2. The combination with a window, window-screen or the like, of an entrapping device consisting of a top plate having downwardly-extending end portions, openings in said top plate, downwardly-extending sections secured to said top plate and said side pieces, and a removable cage situated upon said top plate and provided with openings communicating with said openings of the top plate.

In testimony whereof I have signed this specification in the presence of two subscribing witnesses.

CORNELIUS H. ELSKAMP.

Witnesses:
J. W. MCKIE,
JOE. BALLIGER.